(12) United States Patent
Logsdon

(10) Patent No.: US 10,688,577 B2
(45) Date of Patent: Jun. 23, 2020

(54) BRAZE JOINTS

(71) Applicant: Delavan Inc, West Des Moines, IA (US)

(72) Inventor: Jerry Logsdon, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 682 days.

(21) Appl. No.: 14/750,606

(22) Filed: Jun. 25, 2015

(65) Prior Publication Data

US 2016/0375516 A1 Dec. 29, 2016

(51) Int. Cl.
*B23K 35/24* (2006.01)
*B23K 1/19* (2006.01)
*B23K 1/00* (2006.01)

(52) U.S. Cl.
CPC .................. *B23K 1/19* (2013.01); *B23K 1/00* (2013.01); *B23K 1/0018* (2013.01); *B23K 35/24* (2013.01)

(58) Field of Classification Search
None
See application file for complete search history.

(56) References Cited

U.S. PATENT DOCUMENTS

| | | | | |
|---|---|---|---|---|
| 4,249,963 A | * | 2/1981 | Young | B23K 35/30 148/527 |
| 5,108,025 A | * | 4/1992 | Kang | C04B 37/026 228/124.7 |
| 5,495,978 A | | 3/1996 | Muth | |
| 5,855,313 A | * | 1/1999 | McAfee | B23K 1/0012 228/124.1 |
| 7,797,922 B2 | * | 9/2010 | Eleftheriou | F01D 25/162 415/208.4 |

(Continued)

FOREIGN PATENT DOCUMENTS

| | | |
|---|---|---|
| CN | 1243777 A | 2/2000 |
| EP | 0117136 A2 | 8/1984 |
| EP | 2111975 A2 | 10/2009 |

(Continued)

OTHER PUBLICATIONS

"Inconel Alloy 625", https://www.annericanspecialnnetals.com/inconelalloy625.html, available on web Sep. 2013 (Year: 2013).*

(Continued)

*Primary Examiner* — Devang R Patel
(74) *Attorney, Agent, or Firm* — Locke Lord LLP; Scott D. Wofsy; Joshua L. Jones

(57) ABSTRACT

A method of manufacturing includes depositing a first braze material to a first joint location between a first component having a first coefficient of thermal expansion and an intermediate component. The first component is fitted to the intermediate component at room temperature at the first joint location. A second braze material is deposited to a second joint location between the intermediate component and a second component having a second coefficient of thermal expansion. The second component is fitted to the intermediate component at room temperature at the second joint location. The intermediate component has a coefficient of thermal expansion between the first coefficient of thermal expansion and the second coefficient of thermal expansion.

3 Claims, 2 Drawing Sheets

(56) References Cited

U.S. PATENT DOCUMENTS

2009/0026182 A1* 1/2009 Hu .................. B23K 1/0018
219/121.64
2009/0266870 A1* 10/2009 Yousefiani ............... B32B 7/02
228/112.1

FOREIGN PATENT DOCUMENTS

| JP | S629768 A | 1/1987 |
|----|-----------|--------|
| JP | H0761869 A | 3/1995 |
| WO | WO-98/03297 A1 | 1/1998 |

OTHER PUBLICATIONS

"Alloy 625", https://www.upmet.com/products/nickel-alloys/alloy-625, available on web Mar. 2015 (Year: 2015).*
Great Britain Intellectual Property Office Search Report for Great Britain Patent Application No. GB1610909.2, dated Jan. 19, 2017.
Inconel alloy 625, Special Metals, published Aug. 13, 2013 (18 pages).

\* cited by examiner

BRAZE JOINTS

BACKGROUND OF THE INVENTION

1. Field of the Invention

The present disclosure relates to manufacturing and, more particularly, to brazing components during manufacturing.

2. Description of Related Art

In many manufacturing processes it is necessary to join one or more parts made of disparate materials. Brazing is one favored technique for this task. However, because parts made of different materials will usually have different coefficients of thermal expansion (CTE), the two parts will expand by different amounts when subjected to the heat of the brazing operation. Additionally, as the parts cool from the peak brazing temperatures, they will contract by different amounts. This creates strains which can result in damage along the brazed interface between the two parts. The higher the brazing temperature, or the greater the difference between the CTE's of the two materials, the more severe these strains become. Designers must account for this and are confined in their design choices because of these phenomena.

Such conventional methods and systems have generally been considered satisfactory for their intended purpose. However, there is still a need in the art for improved method of manufacturing of brazed parts with dissimilar coefficients of thermal expansion. The present disclosure provides a solution for this need.

SUMMARY OF THE INVENTION

A method of manufacturing includes depositing a first braze material to a first joint location between a first component having a first coefficient of thermal expansion and an intermediate component. The first component is fitted to the intermediate component at room temperature at the first joint location. A second braze material is deposited to a second joint location between the intermediate component and a second component having a second coefficient of thermal expansion. The second component is fitted to the intermediate component at room temperature at the second joint location. The intermediate component has a coefficient of thermal expansion between the first coefficient of thermal expansion and the second coefficient of thermal expansion.

In one embodiment, the method can further include heating the first component and intermediate component prior to depositing the second braze material to melt the first braze material and form a first braze joint. The second component and the intermediate component can then be heated to melt the second braze material and form a second braze joint. A melting temperature of the first braze material can be different from a melting temperature of a second braze material. For example, the melting temperature of the first braze material can be greater than the melting temperature of the second braze material.

The method can include heating the first, second and intermediate components together to melt the first and second braze materials to form first and second braze joints. In this embodiment, the melting temperature of the first braze material can be equal to the melting temperature of a second braze material.

The first and second braze materials can include at least one material chosen from the group consisting of nickel based alloys often containing boron, chromium, iron, nickel, cobalt, silicon, carbon and/or phosphorous; precious metal alloys often containing gold, palladium, silver, nickel, copper, tin, and/or zinc; and copper based alloys often containing copper, manganese, nickel, zinc, cobalt, and/or silicon.

In certain embodiment, the first component and the second components can be parts for a turbine engine wherein the first component is a fitting and the second component is a housing. The intermediate component can be an Inconel® (a registered trademark of Special Metals Corporation headquartered in New Hartford, N.Y.) 625 sleeve.

A process of joining a first and second component includes depositing a first braze material between the first component and an intermediate component and a second braze material between the intermediate component and the second component and fitting the first component to the intermediate component and fitting the intermediate component to the second component at a respective first and second braze joint locations. An assembled structure including the first, second and intermediate components can be manufactured by the process described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
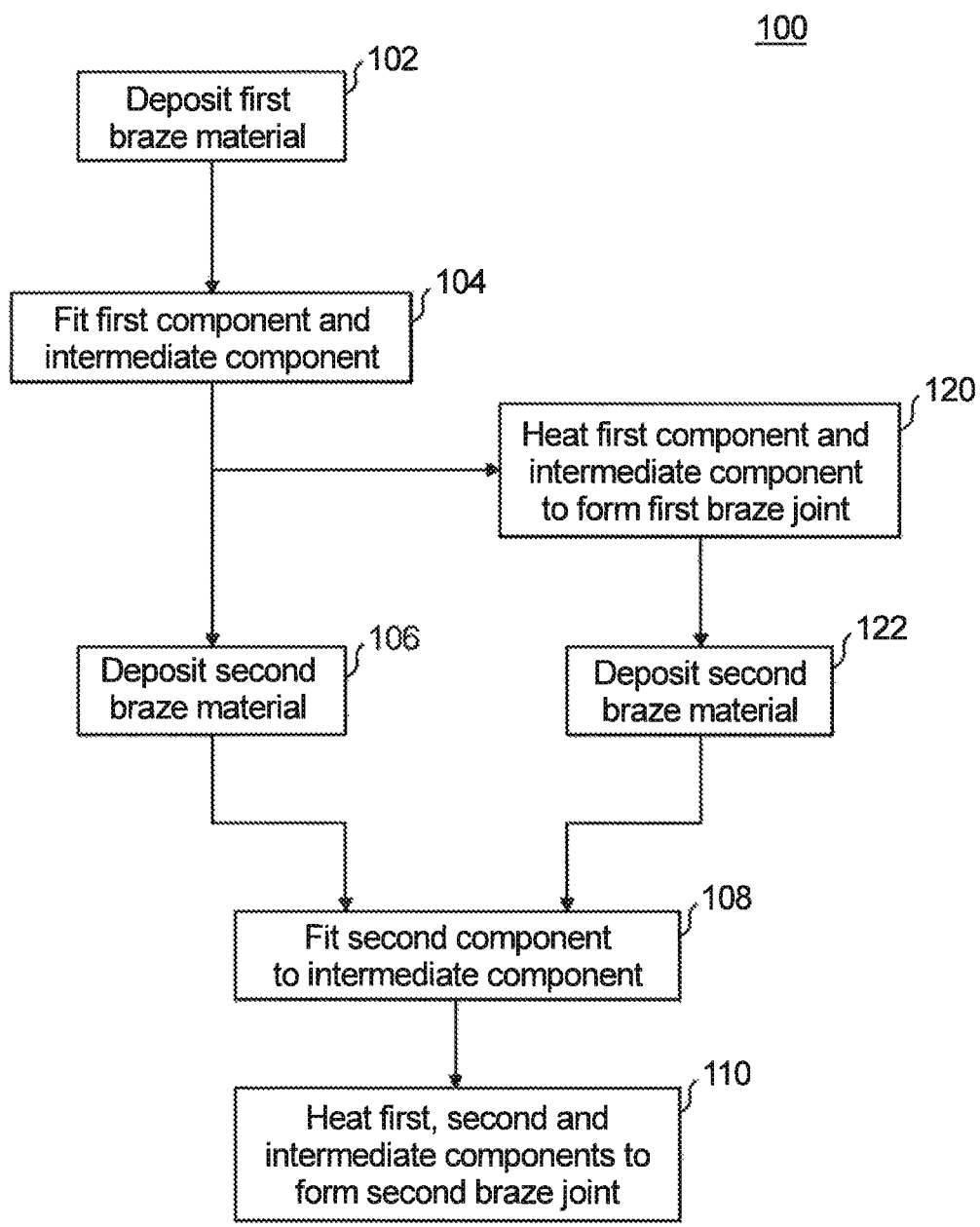
FIG. 1 is a diagram of an exemplary embodiment of a method of manufacturing constructed in accordance with the present disclosure, showing two processes for forming first and second braze joints.

Reference will now be made to the drawings wherein like reference numerals identify similar structural features or aspects of the subject disclosure. For purposes of explanation and illustration, and not limitation, a partial view of an exemplary embodiment of a method of manufacturing a braze joint design for materials with dissimilar coefficients of thermal expansion in accordance with the disclosure is shown in FIG. 1 and is designated generally by reference character 100. Other embodiments of the braze joint design in accordance with the disclosure, or aspects thereof, are provided in FIG. 2, as will be described. The method described herein can be used to improve the method of joining materials having different coefficients of thermal expansion.

With reference to FIG. 1, a method 100 of manufacturing components (e.g., first and second components 202 and 206, shown in FIG. 2) with dissimilar coefficients of thermal expansion is shown. The method 100 utilizes an intermediate layer (e.g., intermediate component 204) to allow for fitting components together to complete the brazing process and create more than one braze joint with less strain than typically assembled structures. The method 100 described herein can be used for any assembled structure which includes components of dissimilar coefficients of thermal expansion and in particular assembled structures that operate at high temperatures, for example turbine engines, heat exchangers, or the like. The intermediate component bridges the gap between the dissimilar coefficients of thermal expansion between the components. As described in further detail below, the method 100 disclosed herein can be a one cycle approach wherein first and second braze joints are formed simultaneously or a two cycle approach wherein the first braze joint is formed and the second braze joint is formed thereafter. The one cycle and two cycle approaches vary based on heating respective components once or twice.

The method 100 begins with depositing a first braze material (e.g. first braze material 210) to a first joint location (e.g., first joint location 230) between a first component and an intermediate component, as shown in box 102. The first and intermediate components are fitted together at room temperature at the first joint location, as shown in box 104. Traditional processes for forming braze joints with materials of dissimilar materials require that one or both components be heated or cooled because of interference fits at room temperature. The present method eliminates this need as the intermediate component and multiple braze joints allow for fitting the desired components at room temperature.

After the first and intermediate components are fitted together, the method can be distinguished between the one cycle or two cycle approach. Following the one cycle approach, as shown in box 106, a second braze material (e.g., second braze material 212) is deposited to a second joint location (e.g., second joint location 232) between the intermediate component and the second component. As shown in box 108, the second component is then fitted with the intermediate component at the second joint location at room temperature. The first, intermediate and second components of the assembled structure are heated to liquefy the braze material and form the first and second brazed joints, as shown in box 110. The first and second braze joints can be checked for gaps or any stress/strain related factors. As described, the one cycle approach involves heating the first, second and intermediate components once during manufacturing to form first and second braze joints simultaneously.

When following the two cycle approach, after fitting the first component with the intermediate component, as shown in box 120, the first and intermediate components are heated to create the first braze joint. At this point, the first braze joint can be checked for gaps or any stress/strain related factors. If the first braze joint meets the required standards of the respective assembled structure, the second braze material is deposited between the intermediate component and the second component and the second component is fitted to the intermediate component as shown in boxes 122 and 108. The first, intermediate and second components of the assembled structure are heated to form the second brazed joint, as shown in box 110. As described, the two cycle approach involves heating the first and intermediate component and forming the first braze joint and then reheating the first and intermediate components along with the second component to form the second braze joint. The braze materials can include at least one material chosen from the group consisting of nickel based alloys often containing boron, chromium, iron, nickel, cobalt, silicon, carbon and/or phosphorous; precious metal alloys often containing gold, palladium, silver, nickel, copper, tin, and/or zinc; and copper based alloys often containing copper, manganese, nickel, zinc, cobalt, and/or silicon.

Figure 2:
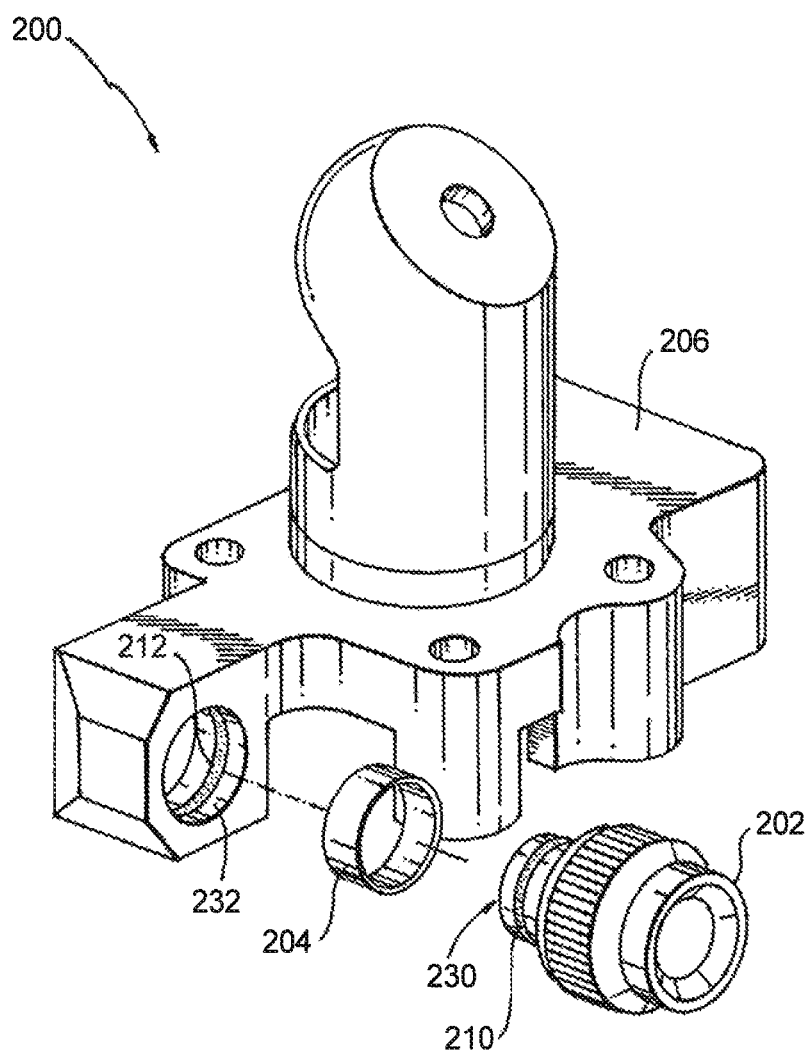
FIG. 2 is an exploded perspective view of an exemplary structure assembled with first and second components using the methods of FIG. 1.

Placement of the first and second braze materials can vary either on manufacturing requirements, the specific braze materials used, the type of assembled structure, or other similar variations. For example, the first and second braze materials may be deposited on each of the first, second, and intermediate components. In other embodiments, the first and second braze material may only be deposited on the intermediate component. In yet other embodiments, the first and second braze material may be deposited on the first and second components, respectively. For ease of illustration, the first and second braze materials are shown in FIG. 2 as being deposited on the respective first and second components. The first and second braze materials can be made from a varying combination of alloys such that the melting temperatures of the first and second braze materials are different. For example, if following the two cycle method, the first braze material can have a greater melting temperature than the second braze material. In this example, the temperature required to form the second braze joint will not affect the first braze joint previously formed. In other words, the melting temperature for the forming second braze joint is less than the melting temperature used for forming the first braze joint thus the first braze material will not be re-melted when forming the second braze joint.

FIG. 2 illustrates a specific assembled structure 200 that benefits from the method of manufacturing, described above. The first and second components 202, 206 can be parts for a turbine engine (e.g., a turboprop engine). The first component 202 is a fitting and the second component 206 is a housing. The fitting and housing 202, 206 have dissimilar coefficients of thermal expansion and typically require the housing 206 to be heated and the fitting 202 to be cooled to compensate for the interference fit present at room temperature during manufacturing. Using the method above, an intermediate component 204, an Inconel® (a registered trademark of Special Metals Corporation headquartered in New Hartford, N.Y.) 625 sleeve is used to bridge the gap in dissimilar coefficients of thermal expansion between the materials.

Those skilled in the art will readily appreciate that the intermediate component is shown and described as one additional component between the first and second components, however the intermediate component can include more than one component part, as needed, without departing from the scope of the present disclosure. For example, in assembled structures where the difference between the coefficients of thermal expansion between the first and second components is significant, the intermediate component may be composed of more than one component part, each have a different coefficient of thermal expansion so as to create a bridge between the first and second components with a gradient of coefficients of thermal expansion.

The methods and systems of the present disclosure, as described above and shown in the drawings, provide for a method of manufacturing with superior properties including brazing components with dissimilar coefficients of thermal expansion. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of manufacturing an assembly for a turbine engine, comprising:

depositing a first braze material to a first joint location between a first component having a first coefficient of thermal expansion and an intermediate component;

fitting the first component to the intermediate component at room temperature at the first joint location;

depositing a second braze material to a second joint location between the intermediate component and a second component having a second coefficient of thermal expansion, wherein a melting temperature of the second braze material is equal to a melting temperature of the first braze material; and fitting the second component to the intermediate component at room temperature at the second joint location, wherein the intermediate component has a coefficient of thermal expansion between the first coefficient of thermal expansion and the second coefficient of thermal expansion, wherein the first component and the second components are parts for the turbine engine, wherein the first component is a fitting and the second component is a housing, and wherein the intermediate component is a sleeve formed from alloy 625, wherein alloy 625 includes a nickel-chromium-molybdenum superalloy comprising at least 58 wt % nickel, 20-23 wt % chromium, 8-10 wt % molybdenum, 3.15-4.15 wt % niobium, up to 5 wt % iron, and up to 1 wt % cobalt, up to 0.5 wt % manganese, up to 0.5 wt % silicon, up to 0.4 wt % aluminum, up to 0.4 wt % titanium, and rest as unavoidable impurities.

2. The method of claim 1, further comprising heating the first, second and intermediate components to melt the first and second braze materials to form first and second braze joints.

3. The method of claim 1, wherein at least one of the first braze material and the second braze material includes at least one material chosen from the group consisting of nickel based alloys containing boron, chromium, iron, nickel, cobalt, silicon, carbon and/or phosphorous, precious metal alloys containing gold, palladium, silver, nickel, copper, tin, and/or zinc, and copper based alloys containing copper, manganese, nickel, zinc, cobalt, and/or silicon.

* * * * *